(12) United States Patent
Jakhetiya et al.

(10) Patent No.: US 10,037,231 B1
(45) Date of Patent: Jul. 31, 2018

(54) METHOD AND SYSTEM FOR JOINTLY DETERMINING COMPUTATIONAL OFFLOADING AND CONTENT PREFETCHING IN A CELLULAR COMMUNICATION SYSTEM

(71) Applicant: Hong Kong Applied Science and Technology Research Institute Co., Ltd., Shatin, N. T. (HK)

(72) Inventors: Vinit Jakhetiya, Rajasthan (IN); Lu Wang, Shenzhen (CN); Fei Yu, Ontario (CA)

(73) Assignee: HONG KONG APPLIED SCIENCE and Technology Research Institute Company Limited, Shatin, N.T. (HK)

( * ) Notice: Subject to any disclaimer, the term of this patent is extended or adjusted under 35 U.S.C. 154(b) by 0 days.

(21) Appl. No.: 15/615,988

(22) Filed: Jun. 7, 2017

(51) Int. Cl.
*H04W 72/00* (2009.01)
*G06F 9/50* (2006.01)
(Continued)

(52) U.S. Cl.
CPC ........ *G06F 9/5072* (2013.01); *H04L 67/1012* (2013.01); *H04L 67/2847* (2013.01);
(Continued)

(58) Field of Classification Search
None
See application file for complete search history.

(56) References Cited

U.S. PATENT DOCUMENTS

2013/0346465 A1 12/2013 Maltz et al.
2016/0217176 A1* 7/2016 Haviv .................. G06F 3/0649

FOREIGN PATENT DOCUMENTS

| CN | 106534333 A | 3/2017 |
| TW | 20061034 A | 3/2006 |
| WO | 2016105362 A1 | 6/2016 |

OTHER PUBLICATIONS

International Search Report and Written Opinion; PCT/090860; dated Feb. 24, 2018.
(Continued)

*Primary Examiner* — German Viana Di Prisco

(57) ABSTRACT

Provided is a method and system in a mobile wireless communication network for jointly determining computational offloading and data prefetching for a plurality of user equipments (UEs) in the mobile network. The method includes using a decision module in the mobile wireless communication network to process data indicative of mobile wireless communication network status including statuses of one or more UEs attached to the network. The decision module is configured to determine if the status of the mobile wireless communication network including said one or more UEs is sufficient to support joint computational offloading and data prefetching by at least one of the UEs. In the case that a positive determination is made, the decision module transmits a message to a UE to enable it to offload part of its computational load to one of a network edge computing node, a mobile wireless communication network server, and server in a network connected to the mobile wireless communication network; and to prefetch data to one of the network edge computing node, the mobile wireless communication network server, and a mobile wireless communication network data cache.

13 Claims, 5 Drawing Sheets

(51) Int. Cl.
    *H04L 29/08* (2006.01)
    *H04L 12/803* (2013.01)
    *H04W 4/00* (2018.01)
    *H04W 4/50* (2018.01)

(52) U.S. Cl.
    CPC ............ *H04L 47/125* (2013.01); *H04L 67/10* (2013.01); *H04W 4/001* (2013.01); *H04W 4/50* (2018.02)

(56) References Cited

OTHER PUBLICATIONS

Liu et al., Catching Wireless Edge: Design Aspects, Challenges, and Future Directions, IEEE Communications Magazine • Sep. 2016 pp. 22-28.

Andreev et al., Exploring Synergy between Communications, Caching, and Computing in 5G-Grade Deployments, IEEE Communications Magazine • Aug. 2016 pp. 60-69.

Chen et al., Efficient Multi-User Computation Offloading for Mobile-Edge Cloud Computing, IEEE/ACM Transactions on Networking, vol. 24, No. 5, Oct. 2016 pp. 2795-2808.

\* cited by examiner

METHOD AND SYSTEM FOR JOINTLY DETERMINING COMPUTATIONAL OFFLOADING AND CONTENT PREFETCHING IN A CELLULAR COMMUNICATION SYSTEM

FIELD OF THE INVENTION

The invention generally relates to a method and a system for jointly determining computational offloading and content prefetching in a cellular communication system and, more particularly, but not exclusively to a method and a system for jointly and dynamically determining computational offloading and content prefetching in a Long Term Evolution (LTE) network employing a Mobile Edge Computing (MEC) paradigm.

BACKGROUND OF THE INVENTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards preferably using OFDMA on the downlink (DL), SC-FDMA on the uplink (UL).

The demand for rich multimedia services over mobile (cellular) communication networks has been increasing over recent years. However, due to the centralized architecture of current mobile networks, the wireless link capacity as well as the bandwidth of the radio access networks and the backhaul network cannot practically cope with the explosive growth in mobile traffic. Despite the continuous efforts of mobile network operators (MNOs) and network equipment vendors to enhance the wireless link bandwidth by adopting sophisticated techniques at both the physical (PHY) layer and the medium access control (MAC) layers in LTE and LTE-Advanced systems, such as massive multiple-input multiple-output (MIMO) antenna schemes, carrier aggregation schemes, and coordinated multipoint (CoMP) transmission/reception schemes, the utilization efficiency of the radio spectrum is reaching its theoretical cap.

Due to the increased processing capability of mobile wireless communication devices such as smartphones, for example, in recent years, computationally intensive mobile applications such as image recognition, gaming, virtual reality, augmented reality, and speech recognition are becoming increasingly popular. Furthermore, data streaming such as video streaming of music and movie videos is popular. However, the computational load and data content requirements of these applications and data streams often leads to quality of service (QoS) issues which in turn lead to quality of experience (QoE) issues for users of the applications as well as quickly draining the mobile device batteries.

One way to address this problem utilizes computational offloading. Offloading computationally intensive tasks to resource-rich servers can reduce power consumption at the mobile device as well as reduce computing time for computationally intensive tasks leading to improved QoS and QoE. At the same time, QoS and QoE can also be improved through data prefetching. In a client-server model for delivery of content, a client typically makes a request for content to a server and the server responds with the requested content. In certain scenarios, the server is often waiting for the client device, or another device, to request the same or next content. To speed up the process, it is known to have the server prefetch certain content so that such content is ready to be served to the client device when the client requests delivery of such content. Prefetching and caching content is also effective where multiple mobile devices are requesting or predicted to request the same content such as, for example, music downloads, video streaming, etc.

U.S. Pat. No. 8,943,348 discloses a decision method which simultaneously considers computing time and power consumption for offloading computations. However, it does not address content prefetching and, when performing computational offloading, it does not take into account network conditions and network costs.

US2014/0310709 discloses techniques for temporarily and/or partially offloading mobile applications to one or more remote virtual machines in a server including establishing an application copy of a mobile application installed on a mobile device at a remote virtual machine, suspending the mobile application on the mobile device and offloading operations of the mobile application to the application copy at the remote virtual machine for a period of time. However, it does not address content prefetching and, when performing computational offloading, it does not take into account network conditions and network costs.

US2014/0379840 discloses a modified server for predictive prefetching whereby the server can predictively prefetch a second object for a client given a request from the client for a first object. However, it does not address computational offloading.

U.S. Pat. No. 8,880,652 discloses a method for predictive caching of web pages for display through a screen of a mobile computing device. A load request is received at a mobile computing device, where the load request includes a current timestamp and an address. The address points to a remote server storing a current copy of the address content. The mobile computing device determines whether there is an existing copy of the address content is pre-cached on the mobile computing device. The mobile computing device determines whether a difference between the current timestamp and a pre-cache timestamp is greater than a heuristic timeliness value. If it is, the mobile computing device pre-caches the current copy of the address content from the remove server at the address on the mobile computing device. The mobile computing device then provides the current copy of the address content for display on its screen. However, it does not address computational offloading.

X. Chen et al., "Efficient Multi-User Computation Offloading for Mobile-Edge Cloud Computing," IEEE/ACM Trans. On Networking, vol. 24, no. 5, October 2016 discloses multi-user computation offloading for mobile-edge cloud computing in a multi-channel wireless interference environment. It proposes a distributed computation offloading decision making scheme among mobile device users. Both communication and computation aspects of mobile-edge cloud computing are taken into account. However, it does not address content prefetching and user mobility within the network.

D. Liu et al. "Caching at the Wireless Edge: Design Aspects, Challenges, and Future Directions," IEEE Communications Magazine, vol. 54, no. 9, pp. 22-28, September 2016 discloses methods to predict the popularity distributions and user preferences, and the impact of erroneous information. It discloses the two aspects of caching systems, content placement and delivery. It describes the trade-offs between spectral efficiency, energy efficiency, and cache size. However, it does not address computational offloading.

Sergey Andreev et al., "Exploring synergy between communications, caching, and computing in 5G-grade deployments", IEEE Communications Magazine Year: 2016, Volume: 54, Issue: 8, Pages: 60-69 describes that all relevant practical factors need to be considered comprehensively to leverage the full synergy of converged communications, caching, and computing architecture, including the structure of content requesting, cost per backhaul connection and operating costs, user mobility control, requirements of running applications, and so on. Although there is some suggestion of offloading and caching, they are considered jointly.

US2015/0215816 discloses a system having a mobile application client that resides on a mobile device and is connected to a cloud server. The system is provided to analyze user content consumption and provide a prefetching schedule to the mobile device. The mobile device is configured to prefetch content partially in accordance with the schedule. However, it does not address computational offloading.

U.S. Pat. No. 8,799,480 discloses a method of prefetching content data in a wireless radio access network (RAN) for improving QoE of users, and for reducing delivery time for certain content objects. However, it does not address computational offloading.

Some factors affecting the performance of computational offloading in a mobile communications network, particularly at the edge of the mobile communications network, include computing power, storage capacity and wireless access efficiency. For example, if too many mobile devices choose to offload some of their computational load to the edge of the network simultaneously, this may generate considerable interference between the mobile devices, which may reduce the QoE for all end users of the mobile devices. Moreover, under limited resource conditions, prefetching data efficiently should also be considered when attempting to maintain or improve QoS and/or QoE as the computational offloading and content prefetching operations must operate under the same limited resource conditions, i.e. compete for the same limited resources. Some problems experienced when offloading computational load and/or prefetching content/data include service fluctuations in the mobile network, reduction in QoS/QoE of services to end users, and less than efficient utilization of network resources.

In view of the foregoing, there is a need to develop a joint offloading and prefetching scheme to address the aforementioned problems.

OBJECTS OF THE INVENTION

An object of the invention is to mitigate or obviate to some degree one or more problems associated with known offloading and/or prefetching schemes.

The above object is met by the combination of features of the main claims; the sub-claims disclose further advantageous embodiments of the invention.

Another object of the invention is to provide a novel joint offloading and prefetching scheme to address the aforementioned problems.

Another object of the invention is to mitigate or obviate to some degree one or more problems associated with known mobile communication systems.

One skilled in the art will derive from the following description other objects of the invention. Therefore, the foregoing statements of object are not exhaustive and serve merely to illustrate some of the many objects of the present invention.

SUMMARY OF THE INVENTION

The invention provides a method and system in a mobile wireless communication network for jointly determining computational offloading and data prefetching for a plurality of user equipments (UEs) in the mobile network. The mobile wireless communication network is preferably a LTE network. The method includes using a decision module in the mobile wireless communication network to process data indicative of mobile wireless communication network status including statuses of one or more UEs attached to the network. The decision module is configured to determine if the status of the mobile wireless communication network including said one or more UEs is sufficient to support joint computational offloading and data prefetching by at least one of the UEs. In the case that a positive determination is made, the decision module may transmit a message to a UE and/or to another network entity to enable said UE or other network entity to offload part of the UEs computational load to one of a network edge computing node, a mobile wireless communication network server, and server in a network connected to the mobile wireless communication network; and to prefetch data for the UE to one of the network edge computing node, the mobile wireless communication network server, and a mobile wireless communication network data cache.

In a first main aspect, the invention provides a method in a mobile wireless communication network of jointly determining computational offloading and data prefetching for a plurality of user equipments (UEs), the method comprising: at a decision module provided in the mobile wireless communication network: processing data indicative of mobile wireless communication network status including statuses of one or more UEs attached to the network; and determining if the status of the mobile wireless communication network including said one or more UEs is sufficient to support joint computational offloading and data prefetching for at least one of the UEs; and in response to said determination at the decision module: enabling a UE to offload part of its computational load to one of a network edge computing node, a mobile wireless communication network server, and server in a network connected to the mobile wireless communication network; and prefetching data intended for said one of the plurality of UEs to one of a network edge computing node, a mobile wireless communication network server, and a mobile wireless communication network data cache.

In a second main aspect, the invention provides a non-transitory computer readable medium storing machine readable code which, when executed by a processor, causes a decision module to implement the steps of the method of the first main aspect of the invention.

In a third main aspect, the invention provides a system in a mobile wireless communication network for jointly determining computational offloading and data prefetching for a plurality of user equipments (UEs), the system comprising a decision module configured to implement the steps of the method of the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
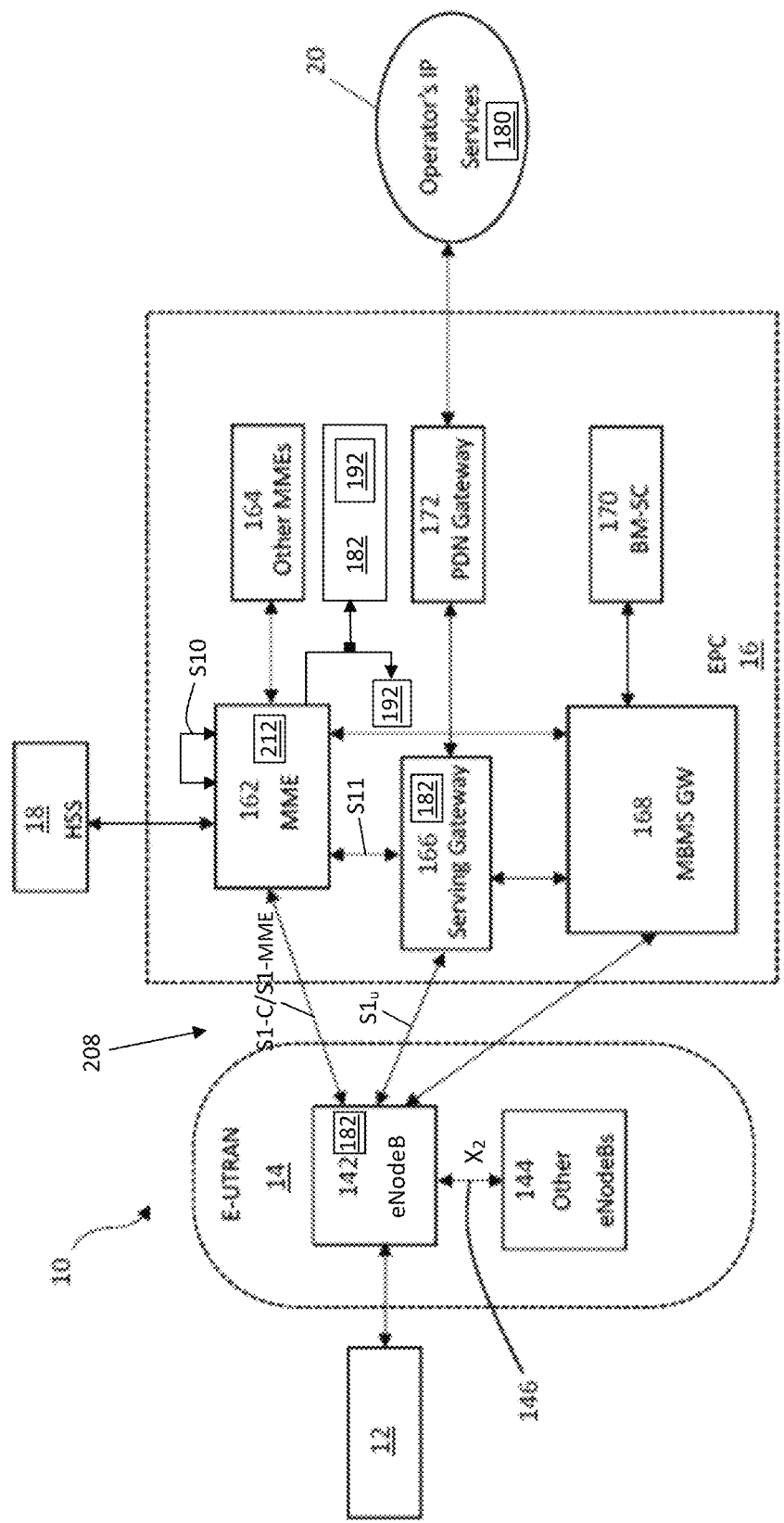
FIG. 1 is a diagram illustrating by way of example only a network architecture for embodiments of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

As will be described herein, the present invention relates to a method and a system for jointly and dynamically determining computational offloading and content prefetching in a mobile communication system. The invention preferably relates to a scheme which jointly determines computational offloading and content prefetching in a LTE network employing MEC resources such as MEC servers and caches in an efficient computation process. Preferably, the scheme is configured to apply to Deep-Learning (DL)-based object recognition applications, which gives attention to, among other things, one or more of mobile network awareness, locations of computational offloading and content prefetching, and QoE of users.

MEC is a network architecture concept that enables cloud computing capabilities and an information technology (IT) service environment at an edge of the mobile communications network. The basic concept behind MEC is that, by running applications and performing related processing tasks closer to the mobile network user, network congestion is reduced and applications perform faster and more efficiently. MEC technology is designed to be implemented at the mobile network base stations, e.g. eNodeBs, although, additionally or alternatively, it may be implemented at the edge of the mobile core network. MEC enables flexible and rapid deployment of new applications and services for mobile device users. Combining elements of IT and telecommunications networking, MEC also allows mobile network operators to open their radio access network (RAN) to authorized third-parties, such as application developers and content providers.

MEC provides a distributed computing environment for application and service hosting. It also has the ability to store and process content in close proximity to mobile network subscribers, for faster response time. Applications can also be exposed to real-time RAN information.

The key element is the MEC application server or MEC server, which is normally integrated at the RAN element, i.e. eNodeB in E-UTRAN in an LTE network, although this is not exclusively the case. The MEC server provides computing resources, storage capacity, connectivity and access to RAN information. It supports a multitenancy run-time and hosting environment for applications. The virtual appliance applications are delivered as packaged operating system virtual machine (VM) images. The MEC platform also provides a set of middleware application and infrastructure services. Application software can be provided from equipment vendors, service providers and third-parties.

The MEC server can be deployed at the eNodeB in the LTE network or at the Radio Network Controller (RNC) in 3G cellular network.

By using mobile edge computing technology, a mobile network operator can efficiently deploy new services for specific customers or classes of customers. The technology also reduces the signal load in the core network, and can host applications and services in a less costly way. It also collects data about storage, network bandwidth, CPU utilization, etc., for each application or service deployed by a third party. Application developers and content providers can take advantage of close proximity to mobile device subscribers and real-time RAN information.

Whilst the embodiments of the present invention will be described with respect to the presence of MEC servers in an LTE network, it will be understood that, whilst this represents the preferred implementation of the invention, it is not essentially the case that the network must be a LTE network and that the network includes MEC servers. Other types of servers may be employed in a wireless network such as, for example, a 3G network to implement the joint offloading and prefetching scheme of the invention.

FIG. 1 is a diagram illustrating, merely by way of example only, an LTE network architecture 10 in which the method of the present invention can be performed, but it will be understood by one skilled in the art that the method may be performed in other network architectures. The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPS 10 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 14 includes an eNodeB 142 and other eNodeBs 144. The eNodeB 142 provides user and control plane protocol terminations toward the UE 12. The eNodeB 142 may be connected to the other eNodeBs 144 via a backhaul (e.g., an X2 interface) 146. The eNodeB 142 may also be referred to as a base station, a Node B, an access point, a transmission point (TP), a base transceiver station, a radio base station, a radio transceiver, a transceiver function, a basic service set (BSS), an extended service set (ESS), or some other suitable terminology. The eNodeB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 142 is connected to the EPC 16. The EPC 16 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 is connected to the Operator's IP Services 20. The Operator's IP Services 20 may include the Internet, an intranet, and an IP Multimedia Subsystem (IMS). The BM-SC 170 may provide functions for MBMS user service provisioning and delivery. The BM-SC 170 may serve as an entry point for content provider MBMS transmission, may be used to authorize and initiate MBMS Bearer Services within a Public Land Mobile Network (PLMN), and may be used to schedule and deliver MBMS transmissions. The MBMS Gateway 168 may be used to distribute MBMS traffic to the eNodeBs (e.g., 142, 144) belonging to a Multicast Broadcast Single Frequency Network (MBSFN) area broadcasting a particular service, and may be responsible for session management (start/stop) and for collecting eMBMS related charging information.

Figure 2:
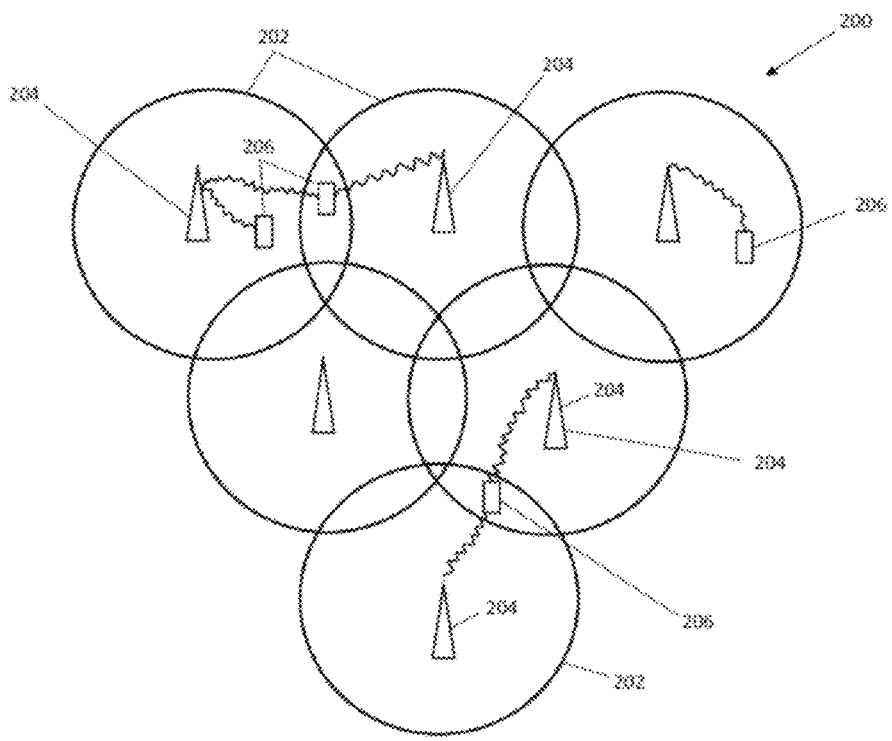
FIG. 2 is a diagram illustrating by way of example only an access network for embodiments of the present invention.

FIG. 2 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNodeBs 204 may be configured to provide all radio related functions including radio bearer control, admission control, mobility control, scheduling, security, and connectivity to the serving gateway 166. An eNodeB may support one or multiple cells (also referred to as a sector). The term "cell" can refer to the smallest coverage area of an eNodeB and/or an eNodeB subsystem serving a particular coverage area. Further, the terms "eNodeB," "base station," and "cell" may be used interchangeably herein.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The LTE control plane is responsible for control operations such as network attaches, security control, authentication, setting up of bearers, and mobility management. It corresponds to the information flow and signaling between UE 12, E-UTRAN 14 and EPC 16, which includes all the Radio Resource Control (RRC), EUTRAN signaling and Non-Access-Stratum (NAS) signaling. In other words, the LTE control plane is a string of sequential operations that are compute centric.

As can be seen in FIG. 1, which illustrates E-UTRAN/EPC interactions, user signaling and data connectivity, the S1 interface defines the forwarding of packets between eNodeB 142 and MME 162 and serving gateway 166. The MME 162 is the main control element for the LTE access-network. It covers all the UE tracking and paging procedures including retransmissions. It also plays a key role in the bearer activation/deactivation process and is responsible for choosing the right serving gateway 166 for a UE 12 at the initial network attach procedure and at the time of intra-LTE handover involving Core Network (CN) node relocation. The S1 interface can be split into two parts: S1-U (for User plane) which carries user data between the eNodeB 142 and the serving gateway 166, and S1-C/S1-MME (for Control plane) which is a signaling-only interface between the eNodeB 142 and the MME 162.

Figure 3:
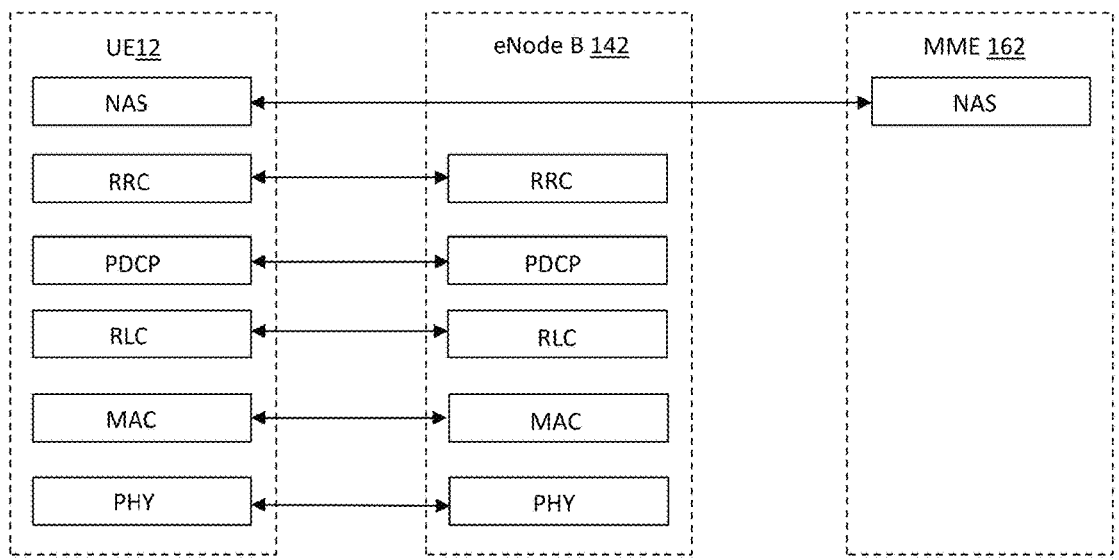
FIG. 3 is a diagram of the LTE control plane protocol stack for the network architecture of FIG. 1.

From the protocol stack perspective, as shown in FIG. 3, the LTE control plane uses the same PHY, MAC, RLC, and PDCP to transport both RRC and Core Network NAS signaling. The RLC, MAC and PHY layers support the same functions for both the user and control planes. This does not mean that the user and control plane information is transmitted the same way. Several Radio Bearers (RBs) can be established between the UE 12 and the LTE network, each of them corresponding to a specific transmission scheme, radio protection method and priority handling. Additional control plane layers include the RRC, E-UTRAN signaling supporting functions such as Radio Bearer management, radio mobility, user paging, and NAS signaling supporting functions and services that are independent from the access technology.

The RRC protocol belongs to the UMTS WCDMA protocol stack and handles the control plane signaling of Layer 3 between the UEs 12 and the E-UTRAN 14. It includes: RRC connection management; establishment and release of radio resources; broadcast of system information; paging; and transmission of signaling messages to and from the EPC.

Protocol signal handling happens within the control plane, including system information broadcast, MME configuration update procedure, contention/non-contention based random access procedure, RRC connection setup, attach/detach procedure, and NAS common procedure.

As already mentioned, the MME 162 is the key control-node for the LTE access network. It works in conjunction with the eNodeB 142 and the serving gateway 166 within the EPC 16 to perform various functions including: bearer activation/deactivation process; choosing the serving gateway 166 for a UE 12 at the initial attach procedure and at the time of intra-LTE handover involving CN node relocation; provides PDN gateway 172 selection for a subscriber to connect to a PDN such as Operator's IP Services 20 in FIG. 1; provides idle mode UE tracking and paging procedure, including retransmissions; is responsible for authenticating the UE 12 by interacting with the HSS 18; and works as termination point for NAS signalling, among other things.

Referring again to FIG. 1, the S10 interface is used for MME 162 relocation and MME-to-MME information transfer or handoff. The S1-MME Interface is the reference point for the control plane protocol between eNodeB 142 and MME 162. S1-MME uses the S1 Application Protocol (S1-AP) over the Stream Control Transmission Protocol (SCTP) as the transport layer protocol for guaranteed delivery of signalling messages between MME 162 and eNodeB 142. This is the interface used by the MME 162 to communicate with eNodeBs 142 on the same LTE PLMN. This interface serves as a path for establishing and maintaining subscriber UE contexts. The S11 Interface provides communication between the MME 162 and serving gateways 166 for information transfer. This interface uses the GPRS Tunneling Protocol version 2 (GTPv2). One or more S11 interfaces can be configured per system context.

Some of the factors affecting the performance of an MEC paradigm in a mobile wireless communication network such as an LTE network (FIG. 1) include computing power, data storage capacity, and wireless access efficiency, etc. Taking into account different network entities in different application scenarios, the current invention proposes functionalities and signaling schemes required for an adaptive joint offloading and prefetching scheme which is computationally efficient to implement. Consequently, the invention provides a method or scheme to perform joint offloading and prefetching in a mobile network 10 which considers the network conditions and QoE requirements of users.

Figure 4:
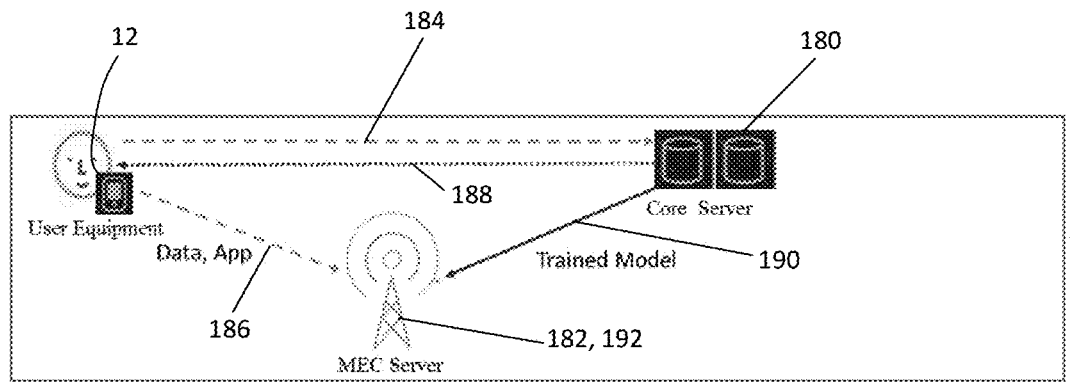
FIG. 4 is a schematic diagram illustrating computational offloading and data prefetching between a UE, an MEC server and a core server.

Referring to FIG. 4, shown is an example of a scenario where a UE 12 in a mobile network (FIG. 1) has offloaded (dashed lines 184, 186) some of its computational load to either a core server 180 or an MEC server 182 and, at about the same time or simultaneously, the core server 180 has prefetched (dashed line 188) data for the UE 12.

In the case of offloading by the UE 12, it is preferred that the UE 12 offloads to the MEC computing node or server 182 which is located at the edge of the mobile network for reasons as explained above including that it reduces the signal load in the core network, i.e. EPC 16. The MEC server 182 may be co-located with the eNodeB 142 as shown in FIGS. 1 and 4 or at a core network (EPC 16) entity such as the serving gateway 166 as shown in FIG. 1. In other embodiments, the MEC 182 may be a separate or standalone computing entity in the EPC 16. When offloading, the UE 12 may offload application data to the MEC server 182 as well as part of its computational load. The MEC server 182 may provide a cache 192 for receiving and caching the prefetched data, but the cache 192 may comprise a separate network entity (FIG. 1).

In the case of prefetching, this may be initiated by a request from the UE 12 to the core server 180 or be initiated by the core server 180 in anticipation of next expected content data required soon by the UE 12. The core server 180 may be located within the EPC 16, but normally is found in the Operator's IP Services 20 such as a connected PDN or a public network such as the internet. As such, it is preferred not to prefetch data across the EPC 16 and, in some embodiments, the MEC server 182 will load an application enabling it to prefetch data for the UE 12. For Deep-Learning (DL) scenarios, the core server 180 may be configured to provide (line 190 of FIG. 4) a trained model to the MEC server 182 whereby the MEC server 182 is enabled to make available Deep-Learning (DL) applications at the edge of the network to UEs 12 as well as prefetching content data for the UE 12.

Several problems have to be considered when jointly implementing offloading and prefetching services at one or more of the UEs 12 in the mobile network 10. One such problem is fluctuations of service to UEs 12 provided by the EPC 16. This might be considered a QoS issue. Furthermore, QoE for users of UEs 12 of services and efficient utilization of network resources should be considered at the same time. For instance, when the user is performing a Deep-Learning (DL)-based application, the future, for example, 10 seconds, of data segments may be predicted for download by the UE 12. The scheme of the invention preferably evaluates buffer status and QoE of the one or more UEs 12, taking into account current and preferably future statuses of the network 10 such as user mobility, network load, network costs, etc., and then instructs or assists the UE 12 or E-UTRAN 14 to request additional data segments from the core server 180. Data can be either pulled by the UE 12 and/or MEC server 182 or pushed by the core server 180 to the UE 12 and/or the MEC server 182.

Figure 5:
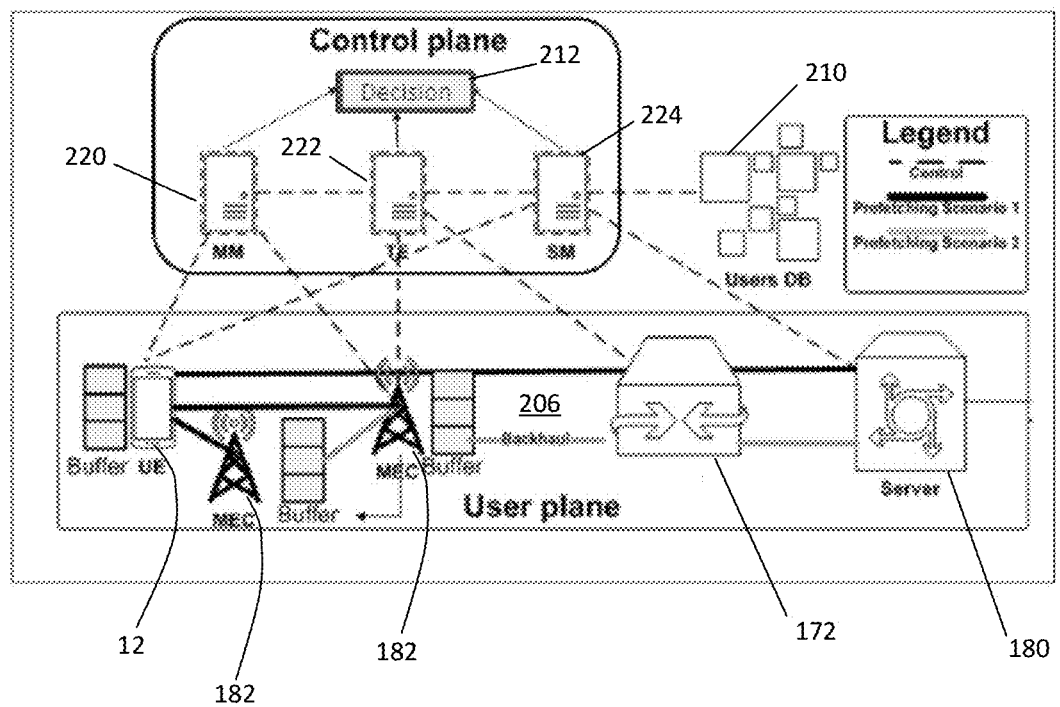
FIG. 5 is a schematic diagram illustrating interactions between three network entities comprising a Mobility Management (MM) module, a Traffic Engineering (TE) module, and a Session Management (SM) module together with a decision module in the control plane for implementing the scheme according to the invention.

FIG. 5 illustrates the interactions between the network entities which are configured to implement the scheme of the invention by which a decision for one or more of the UEs 12 to implement offloading and prefetching is automatically taken in the control plane of the mobile network 10. The entities configured to implement the scheme of the invention comprise a Mobility Management (MM) module 220, a Traffic Engineering (TE) module 222 and a Session Management (SM) module 224. The MM module 220 maintains the mobility context of UEs 12, and predicts mobility patterns, locations, and handovers for UEs 12. These may facilitate and/or trigger the joint offloading and prefetching procedure. The SM module 224 interacts with the UEs 12 and servers 180, 182 to coordinate data segments transmissions. It instructs or assists in notifying offloading and prefetching operations to UEs 12 and MECs 182 in coordination with other network entities and content servers. The TE module 222 interacts with the MEC server 182, the MM module 220, and the SM module 224 to predict data rates allocated to UEs 12 over the network backhaul 206 and the air interface 208 (FIG. 1). It does this in coordination with UEs 12, other network entities and content servers. All of the MM module 220, the TE module 222 and the SM module 224 may be embodied in the MME 162. A users' database 210 for UEs 12 stores historic information for any or all of UEs 12. It may also store historic information data for the mobile network 10, the mobile network entities 142, 162, 164, 166, 168, 170, 172, etc., and connected networks 20, and may send data automatically or in response to requests to corresponding network entities 142, 162, 164, 166, 168, 170, 172. This may be achieved using the messaging interfaces of the types shown in FIG. 1.

The decision to perform joint offloading and prefetching at any UE 12 is enabled by the above three network entities, namely the MM module 220, the TE module 222 and the SE module 224 in concert with a decision module 212. The decision module 212 may be a real or virtual module preferably also embodied in the MME 162 (FIG. 1), although it may be embodied in any network entity functioning in the control plane. The decision module 212 is configured to operate only in the control plane. The decision module 212 may comprise the MM module 220, the TE module 222 and the SE module 224.

The decision module 212 is configured to solve the following optimization problem for the mobile network 10:

$$\max_{a^{comm}_{u_s,k}(t), a^{comp}_{u_s,m}(t), a^{cache}_{u_s,c}(t)} U_{u_s}(t)$$

and $$U_{u_s}(t) = \sum_{k=1}^{K} a^{comm}_{u_s,k} U^{comm}_{u_s,k}(t) + \sum_{m=1}^{M} a^{comp}_{u_s,m} U^{comp}_{u_s,m}(t) + \sum_{c=1}^{C} a^{cache}_{u_s,c} U^{cache}_{u_s,c}(t)$$

It is assumed that there are K workstations (UEs 12), M MEC servers 182 and C caches 192 in the mobile network 10.

$u_s$: refers to a UE 12

$U_{u_s}(t)$: refers to the total utility (current & predicted) available of a serving UE 12 $u_s$ at time slot t $u_{u_s,k}^{comm}(t)$, $u_{u_s,m}^{comp}(t)$, and $u_{u_s,c}^{cache}(t)$: are respectively utilities due to communication, computation and data pre-fetching at time slot t.

These three utilities are respectively determined by using the SM module 224, the MM module 220, and the TE module 222 and providing their outputs to the decision module 212.

$a_{u_s,k}^{comm}$, $a_{u_s,m}^{comp}$, $a_{u_s,c}^{cache}$: respectively represent the actions or decisions from the decision module 212 for communication, computation and pre-fetching. The actions can be outputted as binary decisions, e.g. {0, 1} where 0 represents no-offloading, 1 represents offloading.

There are no constrains on how to derive $U_{u_s,k}^{comm}(t)$, $U_{u_s,m}^{comp}(t)$, $U_{u_s,c}^{cache}(t)$ There are no constrains on the method to derive the optimal result.

Figure 6:
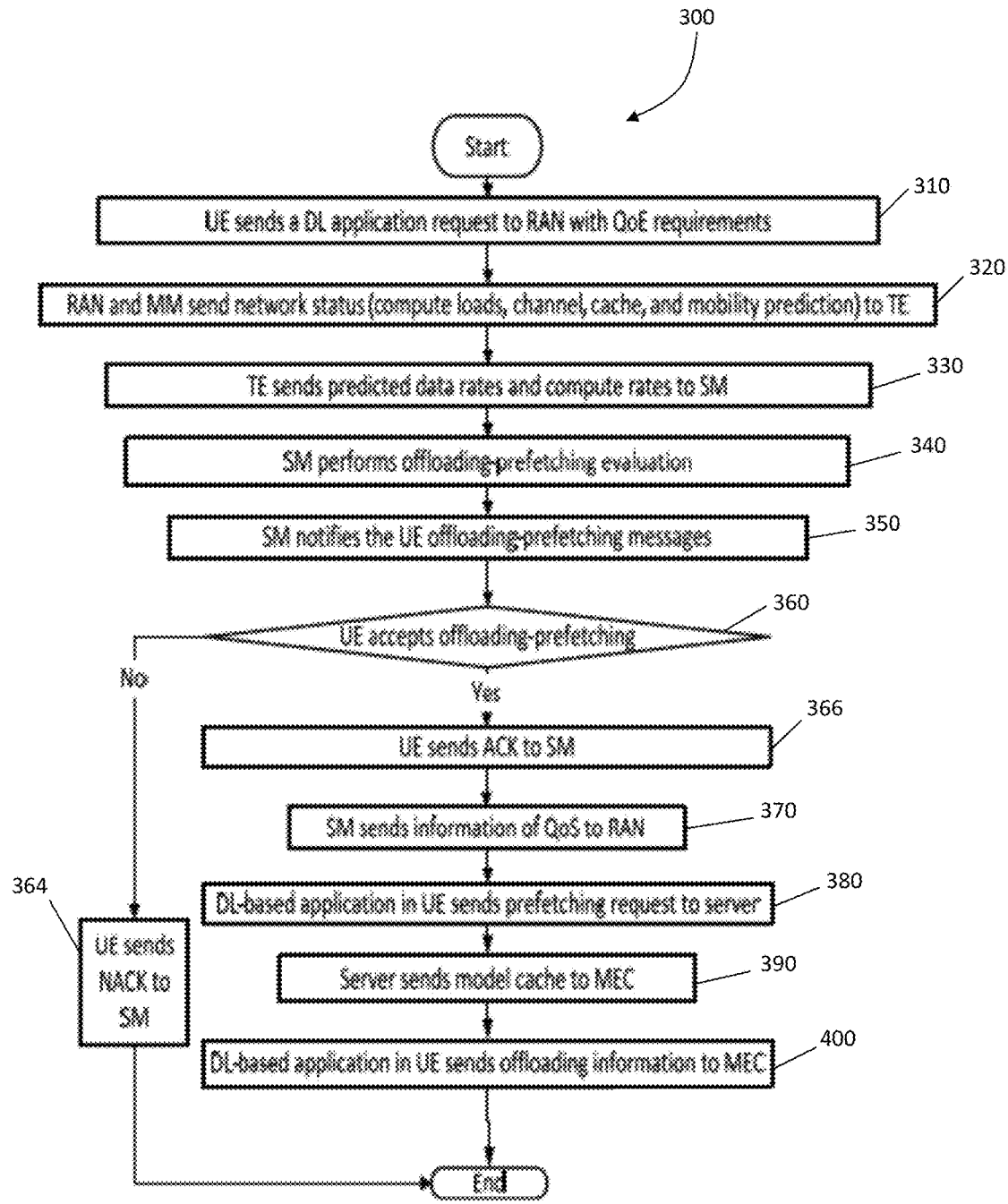
FIG. 6 is a process flow chart of the scheme according to the invention for the joint computational offloading from and data prefetching to a UE.

FIG. 6 is a flow chart 300 for the scheme of the invention. Whilst the flow chart 300 refers to a Deep Learning (DL) application, it will be understood that the scheme of the invention is not limited Deep Learning (DL) applications. The method defined by the flow chart 300 is initiated when a UE 12 makes a request to execute a Deep-Learning (DL) application and the decision module 212 provided in the control plane provides a decision based upon the inputs its receives from the three network entities, namely the MM module 220, the TE module 222 and the SM module 224. Based upon the decision data outputted by the decision module 212, DL trained models may be offloaded and prefetched respectively in the mobile network 10. In a first step 310 of the method 300, a UE 12 sends a Deep Learning (DL) application request to the RAN (E-UTRAN 14) with the UEs' QoE requirements. In a second step 320, the RAN (E-UTRAN 14) and MM module 220 send network status data such as computational loads, channel data, cache status data and mobility predictions to the TE module 222. In a third step 330, the TE module 222 sends a predicted data (fetch) rate or rates and a computational rate or rates for the UE 12 to the SM module 204. In a fourth step 340, the SM module 224 performs a joint offloading and prefetching evaluation and, in a fifth step 350, notifies to the UE 12 joint offloading and prefetching signals or messages. In the event that, at decision box 360, the UE 12 does not accept the joint offloading and prefetching signals or messages, it sends a negative acknowledgement (NACK) message 364 to the SM module 224 and the process ends. In the event that, at decision box 360, the UE 12 accepts the joint offloading and prefetching signals or messages, the UE 12 sends an acknowledgement (ACK) message 366 to the SM module 224, following which, at a sixth step 370, the SM module sends QoS information to the RAN (E-UTRAN 14). In response, at the seventh step 380, the Deep Learning (DL) application in the UE 12 sends a prefetching request to the server 180. In response, at an eighth step 390, the server 180 sends data to the MEC server 182. In a ninth step 400 which can be implemented at about the same time or simultaneously with the seventh step 380, the Deep Learning (DL) application in the UE 12 sends offloading information to the MEC server 182 to thereby complete a joint offloading and prefetching operation in accordance with the invention. The scheme of the invention supports Deep Learning (DL) mobile based applications such as object detection, recognition, tracking, etc.

Figure 7:
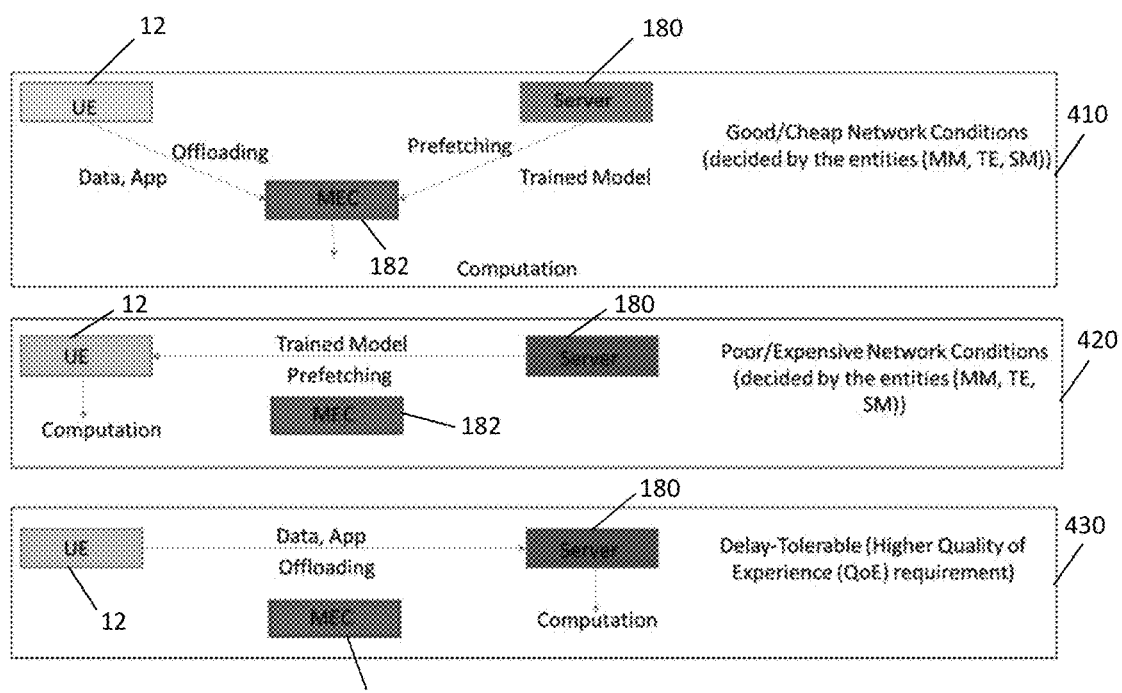
FIG. 7 is a schematic diagram illustrating offloading and prefetching operations for different network conditions and QoE requirements.

As hereinbefore described, the decision for joint offloading and prefetching is taken by the decision module 212 based upon the network conditions (status) of the mobile network 10 and QoE requirement of the UEs 12. For example, referring to the three network scenarios illustrated by FIG. 7, the first scenario 410 shows a situation where the UE 12 offloads to the MEC server 182 and the network server 180 prefetches data to the MEC server 182. In the second scenario 420, it is not desirable to transfer data through the core network (EPC) 16 and the UE 12 will prefetch the trained Deep-Learning (DL) models from the core server 180 to execute the prefetching. In the third scenario 430, the UE 12 will offload to the core server 180 rather than to the MEC server 182.

The apparatus described above may be implemented at least in part in software. Those skilled in the art will appreciate that the apparatus described above may be implemented at least in part using general purpose computer equipment or using bespoke equipment.

The hardware elements, operating systems and programming languages of such computers are conventional in nature, and it is presumed that those skilled in the art are adequately familiar therewith. Of course, any server functions may be implemented in a distributed fashion on a number of similar platforms, to distribute the processing load.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein.

Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method in a mobile wireless communication network of jointly determining computational offloading and data prefetching for a plurality of user equipments (UEs), the method comprising:
   at a decision module provided in the mobile wireless communication network:
      processing data indicative of mobile wireless communication network status including statuses of one or more UEs attached to the network; and
      determining if the status of the mobile wireless communication network including said one or more UEs is sufficient to support joint computational offloading and data prefetching for at least one of the UEs; and
   in response to said determination at the decision module:
      enabling a UE to offload part of its computational load to one of a network edge computing node, a mobile wireless communication network server, and server in a network connected to the mobile wireless communication network; and
      prefetching data intended for said one of the plurality of UEs to one of a network edge computing node, a mobile wireless communication network server, and a mobile wireless communication network data cache.

2. The method of claim 1, wherein the decision module is configured to operate only in a control plane of the mobile wireless communication network.

3. The method of claim 1, wherein the decision module is embodied in a Mobility Management Entity (MME) of the mobile wireless communication network.

4. The method of claim 1, wherein the data indicative of mobile wireless communication network status including statuses of one or more UEs attached to the network comprises data indicative of current statuses and data indicative of future statuses.

5. The method of claim 1, wherein the data indicative of the statuses of one or more UEs comprises data indicative of one or more of UE buffer status and UE user quality of experience (QoE).

6. The method of claim 1, wherein the data indicative of the mobile wireless communication network status comprises data indicative of one or more of mobility patterns of users in the network, networks loads, and network costs.

7. The method of claim 1, wherein the decision module is configured to make a determination by solving the optimization problem:

$$\max_{a_{u_s,k}^{comm}(t), a_{u_s,m}^{comp}(t), a_{u_s,c}^{cache}(t)} U_{u_s}(t)$$

and $$U_{u_s}(t) = \sum_{k=1}^{K} a_{u_s,k}^{comm} U_{u_s,k}^{comm}(t) + \sum_{m=1}^{M} a_{u_s,m}^{comp} U_{u_s,m}^{comp}(t) + \sum_{c=1}^{C} a_{u_s,c}^{cache} U_{u_s,c}^{cache}(t)$$

where it is assumed that there are K workstations (UEs), M servers, and C data caches in the mobile wireless communication network; and
where:
   $u_s$: refers to a UE;
   $U_{u_s}(t)$ is total utility (current & predicted) available for a serving UE $u_s$ at slot t; and
   $u_{u_s,k}^{comm}(t)$, $u_{u_s,m}^{comp}(t)$, and $u_{u_s,c}^{cache}(t)$ are respective utilities due to communication, computational offload, and data pre-fetching at slot t.

8. The method of claim 7, wherein the M servers comprise M mobile edge computing (MEC) nodes or servers in the mobile wireless communication network.

9. The method of claim 1, wherein the network edge computing node comprises a mobile edge computing (MEC) node or server and wherein said MEC computing node or server is provided in an eNodeB and/or in a Evolved Packet Core (EPC) entity.

10. The method of claim 9, wherein the mobile wireless communication network data cache is provided in said MEC computing node or server.

11. The method of claim 1, wherein the decision module comprises a virtual module formed in a control plane of the mobile wireless communication network, said virtual decision module comprising a mobility management (MM) module, a session management (SM) module and a traffic engineering (TE) module.

12. A non-transitory computer readable medium storing machine readable code which, when executed by a processor, causes a decision module provided in a mobile wireless communication network to process data indicative of mobile wireless communication network status including statuses of one or more UEs attached to the network; to determine if the status of the mobile wireless communication network including said one or more UEs is sufficient to support joint computational offloading and data prefetching for at least one of the UEs; and, in response to said determination, to transmit a message to a UE to enable said UE to offload part of its computational load to one of a network edge computing node, a mobile wireless communication network server, and server in a network connected to the mobile wireless communication network, and to prefetch data to one of the network edge computing node, the mobile wireless communication network server, and a mobile wireless communication network data cache.

13. A system in a mobile wireless communication network for jointly determining computational offloading and data prefetching for a plurality of user equipments (UEs), the system comprising:
   a decision module configured to process data indicative of mobile wireless communication network status including statuses of one or more UEs attached to the network; and to determine if the status of the mobile wireless communication network including said one or more UEs is sufficient to support joint computational offloading and data prefetching for at least one of the UEs; and in response to said determination, to transmit a message to a UE to enable said UE to offload part of its computational load to one of a network edge computing node, a mobile wireless communication network server, and server in a network connected to the mobile wireless communication network, and to prefetch data to one of the network edge computing node, the mobile wireless communication network server, and a mobile wireless communication network data cache.

* * * * *